(12) United States Patent
Ishihama et al.

(10) Patent No.: US 11,472,079 B2
(45) Date of Patent: Oct. 18, 2022

(54) INSERT MOLDING METHOD AND INSERT MOLDING COMPONENT

(71) Applicant: CASIO COMPUTER CO., LTD., Tokyo (JP)

(72) Inventors: Takanori Ishihama, Tachikawa (JP); Toshiya Kuno, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 238 days.

(21) Appl. No.: 16/150,817

(22) Filed: Oct. 3, 2018

(65) Prior Publication Data

US 2019/0105820 A1 Apr. 11, 2019

(30) Foreign Application Priority Data

Oct. 5, 2017 (JP) .............................. JP2017-194990

(51) Int. Cl.
*B29C 45/16* (2006.01)
*B29C 45/14* (2006.01)
(Continued)

(52) U.S. Cl.
CPC ...... *B29C 45/1671* (2013.01); *B29C 45/0062* (2013.01); *B29C 45/1418* (2013.01); *B29C 45/14836* (2013.01); *B65D 1/40* (2013.01); *B29C 45/14418* (2013.01); *B29C 45/1657* (2013.01); *B29C 2045/14844* (2013.01); *B29C 2045/1673* (2013.01); *B29K 2995/0015* (2013.01); *B29L 2031/3468* (2013.01)

(58) Field of Classification Search
CPC .. B29C 2045/14844; B29C 2045/1673; B29C 45/0062; B29C 45/1418; B29C 45/14418; B29C 45/14836; B29C 45/1657; B29C 45/1671; B29K 2995/0015; B29L 2031/3468; B65D 1/40; Y02E 60/10

See application file for complete search history.

(56) References Cited

U.S. PATENT DOCUMENTS 7,063,267 B2   6/2006  Tsuchimoto
7,972,721 B2   7/2011  Kozu et al.
(Continued)

FOREIGN PATENT DOCUMENTS

CN      1703789 A    11/2005
CN    103238250 A     8/2013
(Continued)

OTHER PUBLICATIONS

Extended European Search Report (EESR) dated Mar. 4, 2019 issued in counterpart European Application No. 18198564.9.
(Continued)

*Primary Examiner* — Michael M. Robinson
*Assistant Examiner* — Victoria Bartlett
(74) *Attorney, Agent, or Firm* — Holtz, Holtz & Volek PC

(57) ABSTRACT

An insert molding component includes a primary molding section with a concave portion formed on one surface thereof, an insert component disposed on a bottom side of the concave portion of the primary molding section, a heat-insulating component disposed in the concave portion of the primary molding section and disposed on a top of the insert component, and a secondary molding section disposed in contact with the one surface of the primary molding section.

10 Claims, 5 Drawing Sheets

(51) Int. Cl.
    *B29C 45/00*     (2006.01)
    *B65D 1/40*     (2006.01)
    *B29L 31/34*     (2006.01)

(56) References Cited

U.S. PATENT DOCUMENTS

| | | |
|---|---|---|
| 2004/0238623 A1 | 12/2004 | Asp |
| 2005/0112456 A1 | 5/2005 | Kozu et al. |
| 2009/0004557 A1* | 1/2009 | Lasarov .............. H01M 2/1022 |
| | | 429/122 |
| 2010/0230155 A1 | 9/2010 | Hashizume et al. |
| 2011/0149599 A1 | 6/2011 | Wei et al. |
| 2012/0313296 A1* | 12/2012 | Drysdale ........... B29C 45/14836 |
| | | 264/447 |
| 2013/0189558 A1* | 7/2013 | Haussmann ........ H01M 10/613 |
| | | 429/120 |
| 2015/0035641 A1* | 2/2015 | Mochizuki ............. H01H 69/02 |
| | | 337/35 |
| 2016/0236387 A1 | 8/2016 | Carroll et al. |
| 2017/0352923 A1* | 12/2017 | Iwano ................. B32B 37/1009 |
| 2019/0105820 A1 | 4/2019 | Ishihama et al. |

FOREIGN PATENT DOCUMENTS

| | | |
|---|---|---|
| EP | 1519310 A2 | 3/2005 |
| JP | 04252739 A | 9/1992 |
| JP | 2003308815 A | 10/2003 |
| JP | 2007133617 A | 5/2007 |
| JP | 2008210344 A | 9/2008 |
| JP | 2010105719 A | 5/2010 |
| JP | 2019064236 A | 4/2019 |

OTHER PUBLICATIONS

Japanese Office Action (and English language translation thereof) dated Dec. 3, 2019 issued in counterpart Japanese Application No. 2017-194990.
Japanese Office Action (and English language translation thereof) dated Jul. 6, 2021 issued in Japanese Application No. 2020-135937.
Chinese Office Action (and English language translation thereof) dated May 28, 2021 issued in Chinese Application No. 201811170920.2.
Chinese Office Action (and English translation thereof) dated Dec. 13, 2021, issued in counterpart Chinese Application No. 201811170920.2.

* cited by examiner

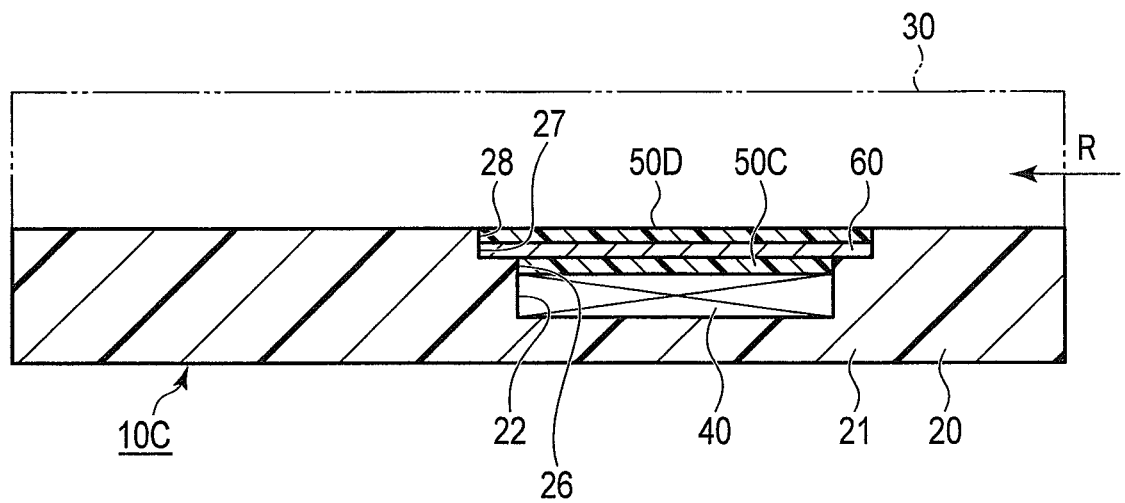
F I G. 7
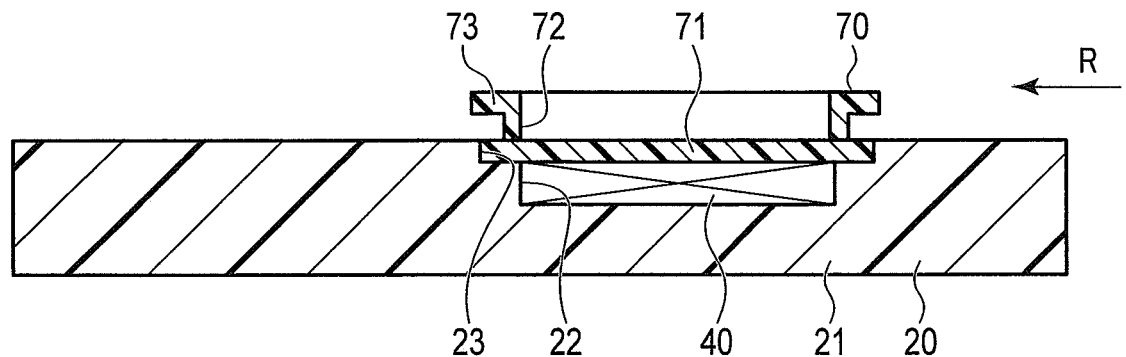
F I G. 8

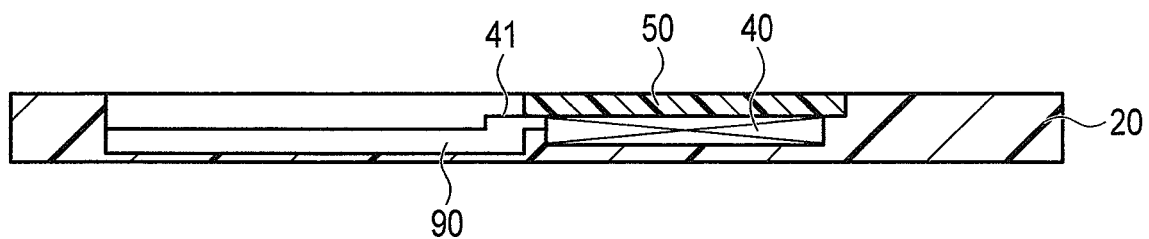
F I G. 12
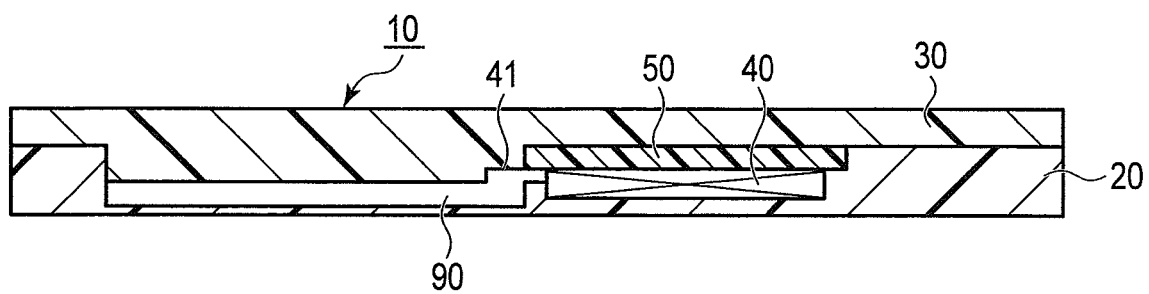
F I G. 13
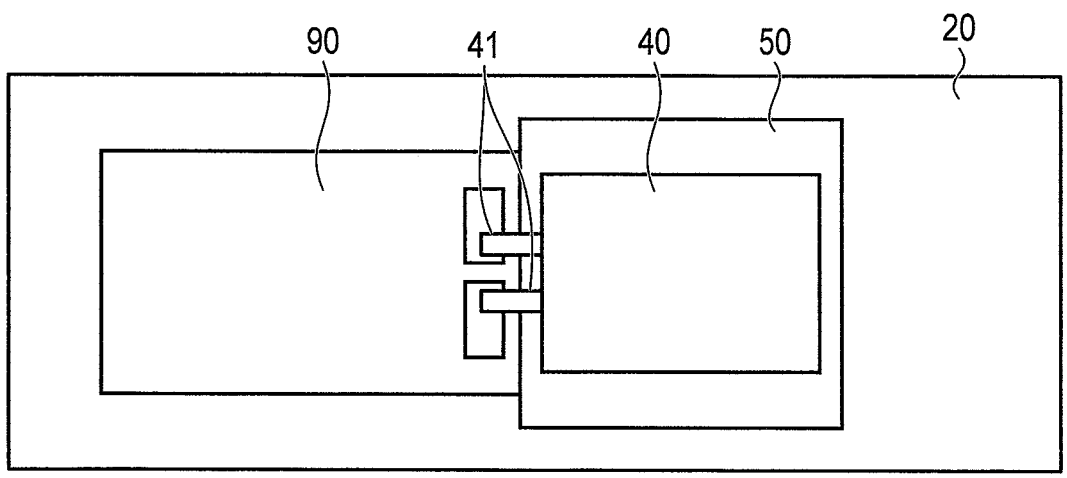
F I G. 14

INSERT MOLDING METHOD AND INSERT MOLDING COMPONENT

CROSS-REFERENCE TO RELATED APPLICATION

This application is based upon and claims the benefit of priority from prior Japanese Patent Application No. 2017-194990, filed Oct. 5, 2017, the entire contents of which are incorporated herein by reference.

FIELD

The present invention relates generally to an insert molding method and an insert molding component, which are capable of preventing an insert component built in a resin molding from degrading.

BACKGROUND

Technologies to downsize products and simplify manufacturing processes by building electronic components and the like in a resin molding by insert molding have recently been proposed, as disclosed in, for example, Jpn. Pat. Appln. KOKAI Publication No. 4-252739.

SUMMARY

According to an aspect of the invention, an insert molding method comprises forming a concave portion on one surface of a primary molding section, disposing an insert component on a bottom side of the concave portion of the primary molding section and laminating a heat-insulating component on an opening side of the concave portion, and molding a secondary molding section to be disposed in contact with the one surface of the primary molding section.

According to an aspect of the invention, an insert molding component comprises a primary molding section with a concave portion formed on one surface thereof, an insert component disposed on a bottom side of the concave portion of the primary molding section, a heat-insulating component disposed in the concave portion of the primary molding section and disposed on a top of the insert component, and a secondary molding section disposed in contact with the one surface of the primary molding section.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 7 is a longitudinal sectional view showing an insert molding component according to a fourth embodiment of the present invention.

FIG. 8 is a longitudinal sectional view showing a manufacturing process of an insert molding component according to a fifth embodiment of the present invention.

FIG. 12 is a side view of the primary molding section shown in FIG. 11, including concave portions in which a lithium-ion battery, a heat-insulating component and a substrate are arranged.

FIG. 13 is a side view of a secondary molding section formed by secondary molding in the state shown in FIG. 12.

FIG. 14 is a top view of the secondary molding section formed by secondary molding in the state shown in FIG. 12.

DETAILED DESCRIPTION

Figure 1:
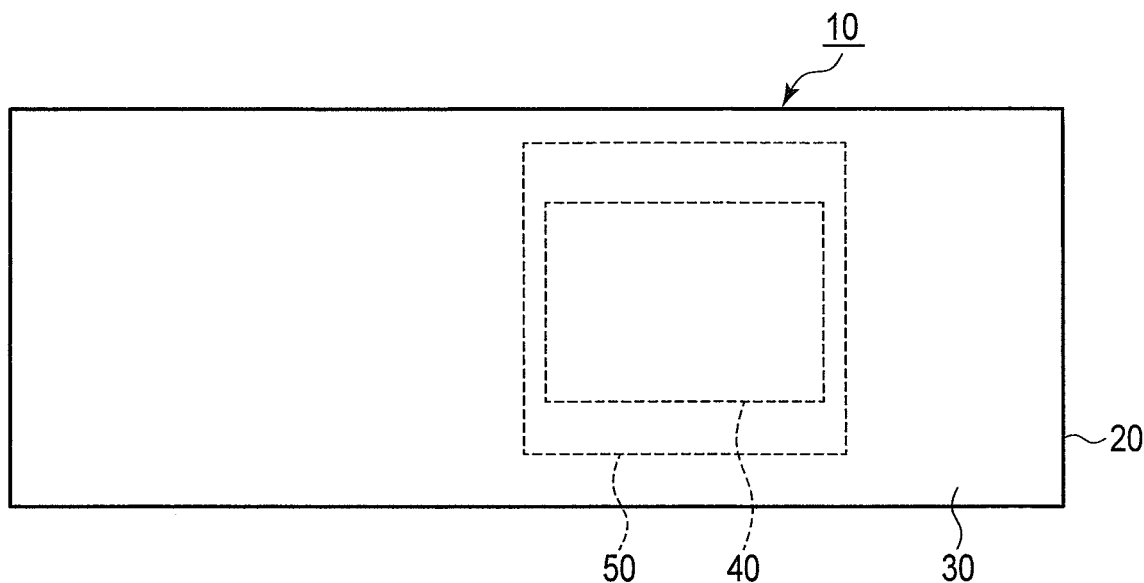
FIG. 1 is a plan view showing an insert molding component according to a first embodiment of the present invention.
Figure 2:
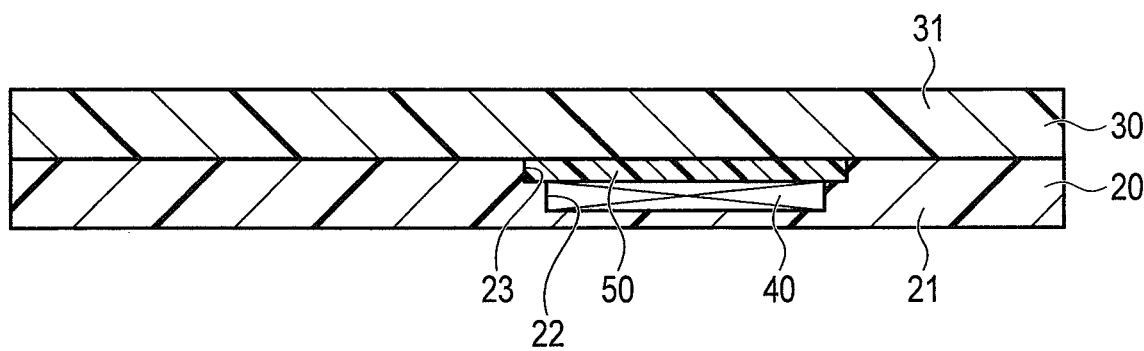
FIG. 2 is a longitudinal sectional view showing the insert molding component according to the first embodiment.
Figure 3:
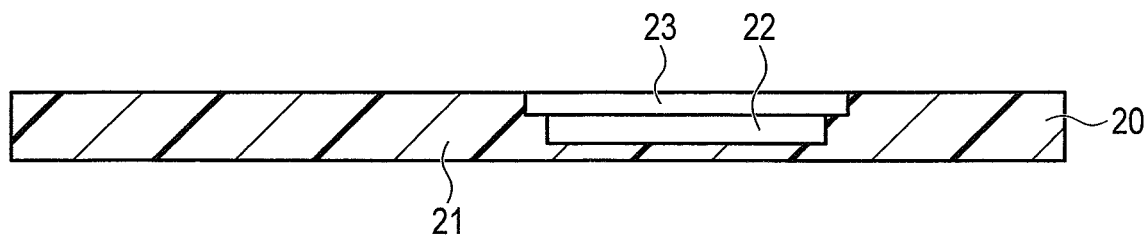
FIG. 3 is a longitudinal sectional view showing a manufacturing process of the insert molding component according to the first embodiment.
Figure 4:
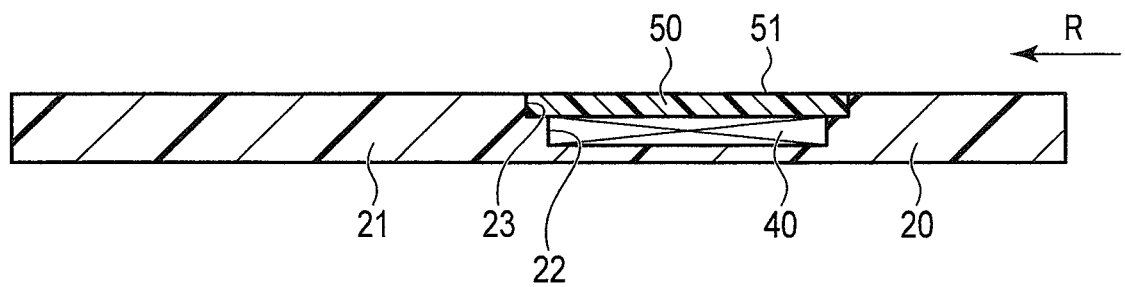
FIG. 4 is a longitudinal sectional view showing a manufacturing process of the insert molding component according to the first embodiment.

FIGS. 1-4 are illustrations of an insert molding component 10 according to a first embodiment of the present invention. FIG. 1 is a plan view showing the insert molding component 10 according to the first embodiment of the present invention. FIG. 2 is a longitudinal sectional view showing the insert molding component 10. FIG. 3 is a longitudinal sectional view showing a manufacturing process of the insert molding component 10. FIG. 4 is a longitudinal sectional view showing a manufacturing process of the insert molding component 10.

As shown in FIGS. 1 and 2, the insert molding component 10 is formed by laminating a primary molding section 20 made of resin material such as acrylic elastomer and a secondary molding section 30 made of resin material such as silicone elastomer. The primary molding section 20 includes a base section 21. The base section 21 includes a lower concave portion 22 and an upper concave portion 23 which are formed in multiple stages (two stages). The area of the opening of the upper concave portion 23 is larger than that of the opening of the lower concave portion 22. The lower concave portion 22 is mounted with a lithium-ion battery (insert component) 40, and the upper concave portion 23 is provided with a heat-insulating component 50 made of olefin sheet material whose thickness is about 0.3 mm to 1 mm. The heat-insulating component 50 includes a plate-shaped base section 51. The operation guaranteed temperature of the lithium-ion battery 40 is 60° C., and it is desirable to maintain the temperature at 60° C. or lower. The temperature at which silicone elastomer is molded to form the secondary molding section 30 is about 150° C.

The insert molding component 10 so configured is formed as described below. First, the primary molding section 20 is injection-molded. Then, as shown in FIG. 3, the base section 21 is formed and then the concave portions 22 and 23 are formed by cutting or the like. Then, as shown in FIG. 4, the lithium-ion battery 40 is mounted on the concave portion 22 and the heat-insulating component 50 is placed thereon. The heat-insulating component 50 and the lithium-ion battery 40 are bonded together by an adhesive or the like. The heat-insulating component 50 is disposed to stay in the concave portion 23.

Subsequently, a mold is placed on the top of the primary molding section 20 and secondary molding is performed to form the secondary molding section 30. The secondary molding section 30 is formed of a plate-shaped base section 31. In FIG. 4, R represents a direction in which resin flows. The silicone elastomer that is a material of the secondary molding section 30 is heated at a temperature in the neighborhood of 190° C. Thus, the top of the heat-insulating component 50 of the primary molding section 20 is heated to a high temperature, whereas the lithium-ion battery 40 is not heated to 60° C. or higher because of thermal insulation properties of the heat-insulating component 50. Therefore, the temperature of the lithium-ion battery 40 does not exceed the operation guaranteed temperature. The heat-insulating component 50 also blocks the pressure. It is desirable that the heat-insulating component 50 be pressed by a holding component or the like such that it is not moved by the pressure of resin.

Even though the lithium-ion battery 40 malfunctions and cannot be sealed to thereby leak a liquid therefrom during or after molding, the liquid does not reach the base section 31 unless it is routed around the heat-insulating component 50 because the area of the heat-insulating component 50 is larger than that of the lithium-ion battery 40, thus making it possible to ensure safety.

It is also desirable to choose the material and thickness of the heat-insulating component 50 by calculating heat capacity based on the amount of heat of the secondary molding section 30. If the heat-insulating component 50 protrudes over the base section 31 of the primary molding section 20, the resin of the secondary molding section 30 easily enters the heat-insulating component 50. The heat-insulating component 50 therefore has such dimensions that it does not protrude.

As described above, the insert molding component 10 formed by the insert molding method according to the first embodiment does not increase the temperature of the lithium-ion battery 40 excessively during the molding of the secondary molding section 30 or it is not influenced by high pressure. The insert molding component 10 can thus be prevented from being damaged and degraded in its properties. Therefore, the insert molding of the lithium-ion battery 40 can be achieved and the insert molding component can be applied to a watch band and a wearable electronic device.

Figure 5:
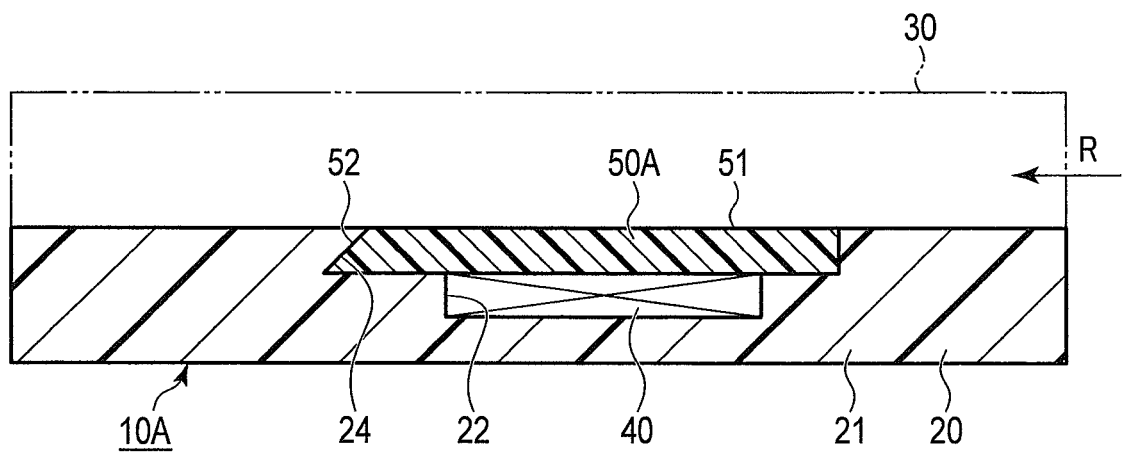
FIG. 5 is a longitudinal sectional view showing an insert molding component according to a second embodiment of the present invention.

FIG. 5 is a longitudinal sectional view showing an insert molding component 10A according to a second embodiment of the present invention. In FIG. 5, like-numbered elements perform the same function as those of FIGS. 1-4 and their detailed descriptions will be omitted.

The insert molding component 10A includes a concave portion 24 in place of the concave portion 23. The wall of the concave portion 24 in a downstream direction along a flow direction R of resin during molding of a secondary molding section is inclined in the downstream direction from the opening of the concave portion 24 to the bottom thereof. A heat-insulating component 50A is inserted into the concave portion 24.

This configuration brings about the same advantage as that of the insert molding component 10 configured by the foregoing insert molding method and the advantage that the heat-insulating component 50A is difficult to detach because force is applied in a direction in which the heat-insulating component 50A is inserted in the interior of the concave portion 24 even though pressure is applied to the heat-insulating component 50A by the flow of resin.

Figure 6:
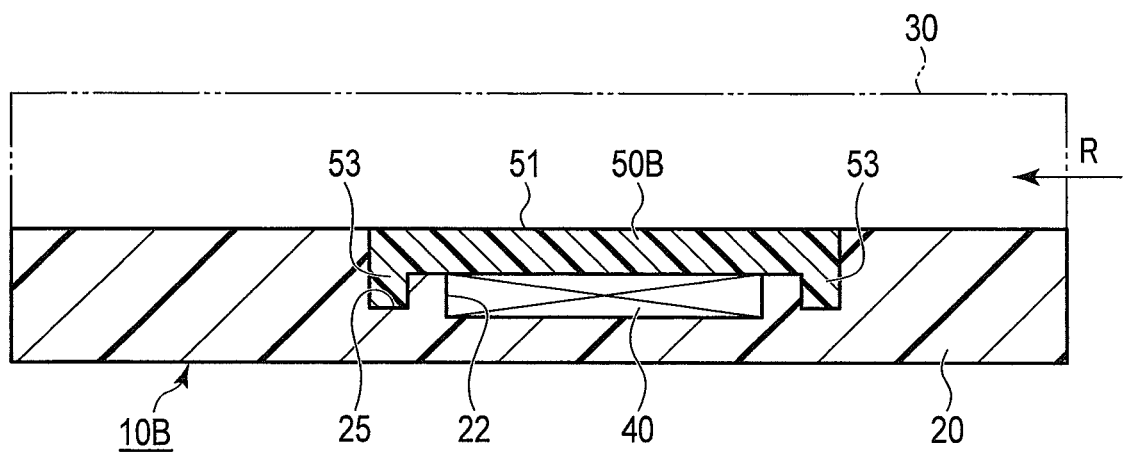
FIG. 6 is a longitudinal sectional view showing an insert molding component according to a third embodiment of the present invention.

FIG. 6 is a longitudinal sectional view showing an insert molding component 10B according to a third embodiment of the present invention. In FIG. 6, like-numbered elements perform the same function as those of FIGS. 1-4 and their detailed descriptions will be omitted.

The insert molding component 10B includes a concave portion 25 in place of the concave portion 23. A groove is formed around the concave portion 25, and the concave portion 25 has a complex outline. The concave portion 25 includes a heat-insulating component 50B. A protruding portion 53 protrudes downward from a base section 51 of the heat-insulating component 50B. The protruding portion 53 is inserted in the groove of the concave portion 25.

This configuration brings about the same advantage as that of the insert molding component 10 configured by the foregoing insert molding method and the following advantage. Even though liquid leaks from the lithium-ion battery 40, it needs to be routed around the concave portion 24 of complex shape. The liquid can thus be prevented from reaching the base section 31 to ensure the safety and like in the second embodiment, the heat-insulating component 50B is difficult to detach due to the flow of resin.

FIG. 7 is a longitudinal sectional view showing an insert molding component 10C according to a fourth embodiment of the present invention. In FIG. 7, like-numbered elements perform the same function as those of FIGS. 1-4 and their detailed descriptions will be omitted.

The insert molding component 10C includes concave portions 26, 27 and 28 in place of the concave portion 23. The concave portion 26 includes a heat-insulating component 50C, the concave portion 27 includes a heat transfer component 60 made of a metallic material or the like, and the concave portion 28 includes a heat-insulating component 50D. The inside diameter of each of the concave portions 27 and 28 is larger than that of each of the concave portions 22 and 26. In other words, the heat transfer component 60 is formed to project from the heat-insulating component 50C.

This configuration brings about the same advantage as that of the insert molding component 10 configured by the foregoing insert molding method. Furthermore, when heat generated from resin to form the secondary molding section 30 is transferred to the lithium-ion battery 40 from the heat-insulating component 50D, it is allowed to escape to the base section 21 from the heat transfer component 60 and the amount of heat transferred to the lithium-ion battery 40 can be decreased.

Figure 9:
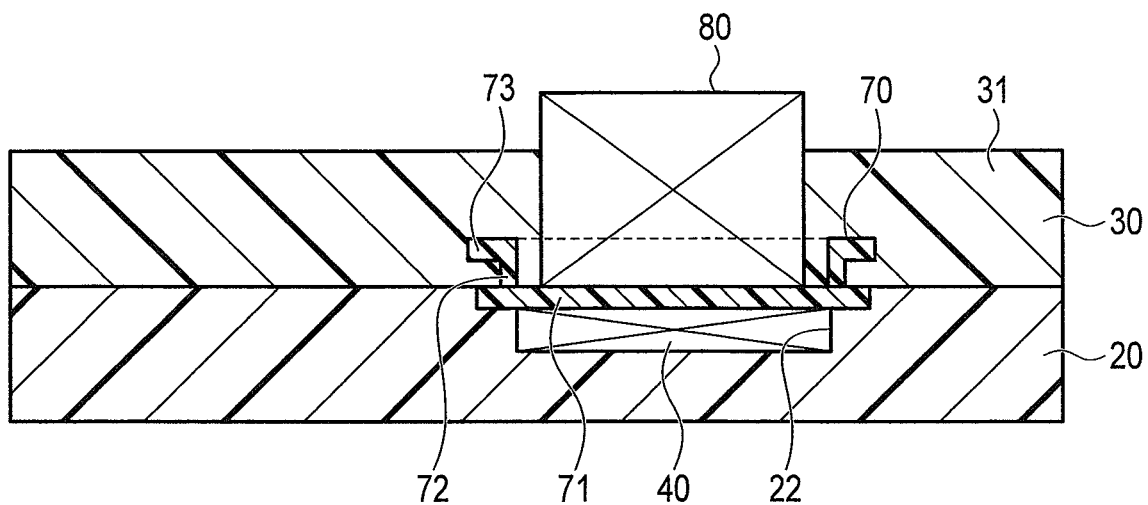
FIG. 9 is a longitudinal sectional view showing a manufacturing process of the insert molding component according to the fifth embodiment.
Figure 10:
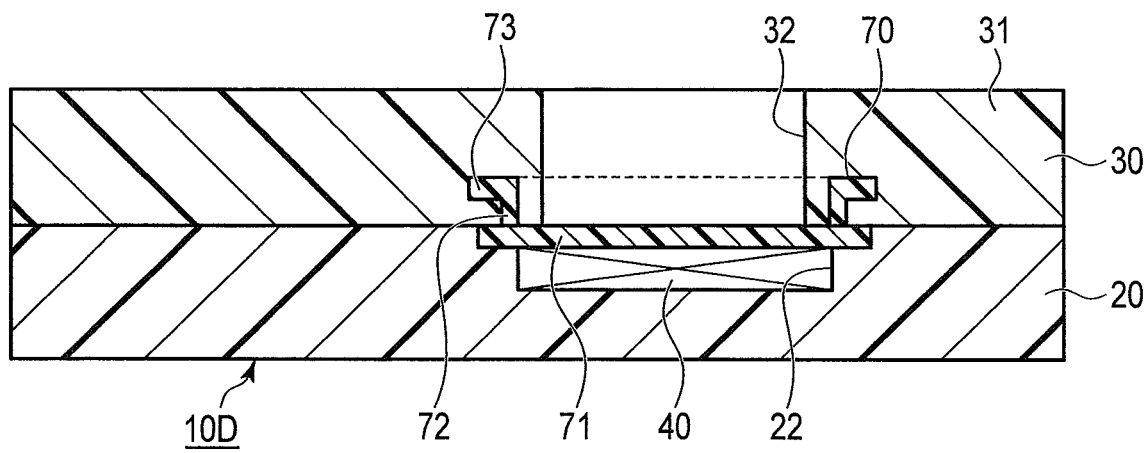
FIG. 10 is a longitudinal sectional view showing a manufacturing process of the insert molding component according to the fifth embodiment.

FIGS. 8-10 are longitudinal sectional views each showing a manufacturing process of an insert molding component 10D according to a fifth embodiment of the present invention. In these figures, like-numbered elements perform the same function as those of FIGS. 1-4 and their detailed descriptions will be omitted.

As shown in FIG. 8, the insert molding component 10D includes a heat-insulating component 70 in place of the heat-insulating component 50. The heat-insulating component 70 includes a base section 71 inserted into the concave portion 23 and a protruding portion 72 that protrudes toward the secondary molding section 30 from the base section 71. A brim portion 73 is also provided in a direction parallel to the flow direction R of resin from the protruding portion 72.

When the heat-insulating component 70 is used, an additional mold (holding member) 80 prevents the heat-insulating component 70 from being moved by resin and also injection molding is performed for the secondary molding section 30 as shown in FIG. 9. After the mold 80 is removed, the insert molding component 10D having a configuration as shown in FIG. 10 is formed.

This configuration brings about the same advantage as that of the insert molding component 10 configured by the foregoing insert molding method. If the amount of resin that is in contact with the base section 71 is decreased, the amount of heat that affects the lithium-ion battery 40 can be reduced. The configuration also brings about the advantage that the strength of the insert molding component increases because the heat-insulating component 70 is sealed in the secondary molding section 30 as well as the primary molding section 20.

FIGS. 11-14 are illustrations showing a primary molding section when the lithium-ion battery 40 of an insert component and a substrate 90 mounted with a circuit operated by the lithium-ion battery 40 are insert-molded together.

Figure 11:
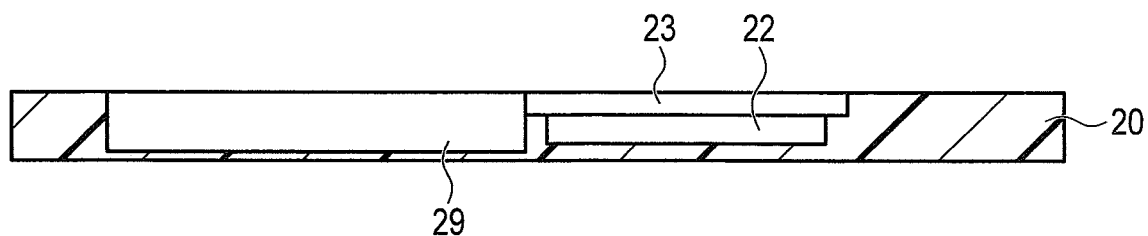
FIG. 11 is a side view showing a primary molding section when a lithium-ion battery of an insert component and a substrate mounted with a circuit operated by the lithium-ion battery are insert-molded together.

FIG. 11 is a side view of the primary molding section 20. The primary molding section 20 includes a concave portion 29 in which the substrate 90 is placed, in addition to the concave portion 22 in which the lithium-ion battery 40 is placed and the concave portion 23 in which the heat-insulating component 50 is placed.

FIG. 12 is a side view of the primary molding section 20 including concave portions in which the lithium-ion battery 40, heat-insulating component 50 and substrate 90 are arranged. The lithium-ion battery 40 and the substrate 90 are electrically connected by a battery connection terminal 41.

FIG. 13 is a side view of the secondary molding section 30 formed by secondary molding in the state shown in FIG. 12. FIG. 14 is a top view of the secondary molding section 30.

According to the insert molding method described above, the insert molding component 10 including the lithium-ion battery 40 and the substrate 90 can be manufactured.

The connection between the lithium-ion battery 40 and the substrate 90 can be made before or after they are arranged in the primary molding section 20. The heat-insulating component 50 can be provided to cover the substrate 90 as well as the lithium-ion battery 40.

The present invention is not limited to the foregoing embodiments. In the foregoing embodiments, the lithium-ion battery is exemplified as an insert molding. Of course, the present invention can also be applied to an organic EL device, an electronic device bonded by an anisotropic conductive film, etc. as a device that is sensitive to heat.

In the second and third embodiments, the upper concave portion and the heat-insulating component are so shaped that the heat-insulating component is difficult to detach due to the flow of resin. However, one of the upper concave portion and the heat-insulating component can be so shaped that the heat-insulating component is difficult to detach.

Additional advantages and modifications will readily occur to those skilled in the art, Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An insert molding method comprising:
    forming a concave portion in one surface of a primary molding section, the concave portion including a lower concave portion and an upper concave portion, and the lower and upper concave portions being stepped portions in which an area of an opening of the upper concave portion is larger than an area of an opening of the lower concave portion, the lower concave portion including a bottom surface, and the upper concave portion including a groove portion;
    disposing an insert component in contact with the bottom surface of the lower concave portion;
    laminating a heat-insulating component in the upper concave portion, above the opening of the lower concave portion in which the insert component is disposed; and
    molding a secondary molding section to be disposed in contact with the one surface of the primary molding section,
    wherein the groove portion is formed at a periphery of the upper concave portion to extend in a direction away from the one surface of the primary molding section such that a portion of the primary molding section intervenes between the groove portion and the lower concave portion along a direction parallel to the one surface of the primary molding section.

2. The insert molding method according to claim 1, wherein the insert component comprises a secondary battery.

3. The insert molding method according to claim 1, wherein a guaranteed temperature of the insert component is lower than a molding temperature of the secondary molding section.

4. The insert molding method according to claim 1, wherein at least one of the upper concave portion and the heat-insulating component is shaped such that the heat-insulating component is difficult to detach due to a flow of resin during molding of the secondary molding section.

5. The insert molding method according to claim 4, wherein a wall of the upper concave portion in a downstream direction along the flow of resin during the molding of the secondary molding section is inclined in the downstream direction from the opening of the upper concave portion to a bottom thereof.

6. The insert molding method according to claim 1, wherein the heat-insulating component includes a protruding portion that protrudes toward the secondary molding section.

7. The insert molding method according to claim 6, wherein the heat-insulating component is held by a holding member protruded from the secondary molding section.

8. The insert molding method according to claim 1, wherein an area of the heat-insulating component is larger than an area of the insert component when viewed in plan view.

9. The insert molding method according to claim 1, wherein an entirety of an area of the insert component is contained within an area of the heat-insulating component when viewed in plan view.

10. The insert molding method according to claim 1, wherein the groove portion is formed to receive a protruding portion of the heat- insulating component when the heat-insulating component is laminated in the upper concave portion.

\* \* \* \* \*